United States Patent [19]
Norden et al.

[11] Patent Number: 4,576,625
[45] Date of Patent: Mar. 18, 1986

[54] FERTILIZERS CONTAINING UREA WITH UREASE INHIBITORS

[75] Inventors: Jürgen Norden, Bochum; Heinrich Aigner, Duelman; Fritz Schindler, Gelsenkirchen; Reinhard Samblebe, Herne, all of Fed. Rep. of Germany

[73] Assignee: Huls Aktiengesellschaft, Marl, Fed. Rep. of Germany

[21] Appl. No.: 622,282

[22] Filed: Jun. 19, 1984

[30] Foreign Application Priority Data

Jun. 24, 1983 [DE] Fed. Rep. of Germany ....... 3322724

[51] Int. Cl.⁴ .......................... C05G 3/02; C05G 3/08
[52] U.S. Cl. .............................................. 71/3; 71/27; 71/28; 71/59; 71/902
[58] Field of Search ................... 71/1, 11, 27, 28, 902, 71/3

[56] References Cited

FOREIGN PATENT DOCUMENTS 46-06361 2/1971 Japan ..................................... 71/902
47-22777 6/1972 Japan ..................................... 71/902

Primary Examiner—Ferris H. Lander
Attorney, Agent, or Firm—Oblon, Fisher, Spivak, McClelland & Maier

[57] ABSTRACT

Fertilizers containing urea with urease inhibitors, wherein the urease inhibitors are bromo-nitro compounds having the formula:

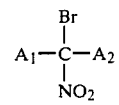

wherein $A_1$ is $(CH_2)_{n_1}X_1$, and $A_2$ is $(CH_2)_{n_2}X_2$, wherein both $n_1$ and $n_2$ and $X_1$ and $X_2$ are the same or different, the alkyl groups of $A_1$ and $A_2$ are straigh-chain or branched-chain alkyl groups, and the substituents $X_1$ and $X_2$ are attached to any one of the carbon atoms of the alkyl groups, and $n_1$ and $n_2$ are 0 to 6, $X_1$ and $X_2$ are H or YR, wherein Y is —O—, —S— or —NH— and R is H or a straight or branched chain $C_1$-$C_6$ alkyl, cyclopent(en)yl cyclohex(en)yl or phenyl group having one to three methyl groups or

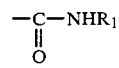

attached thereto, and $R_1$ is H or a straight or branched chain $C_1$-$C_6$ alkyl, cyclopent(en)yl or cyclohex(en)yl group having one to three methyl groups or

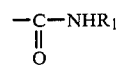

attached thereto.

27 Claims, 1 Drawing Figure

FIG. 1

FERTILIZERS CONTAINING UREA WITH UREASE INHIBITORS

BACKGROUND OF THE INVENTION

1. Field of the Invention

This invention relates to solid or liquid fertilizers containing urea to which urease inhibitors are added.

2. Description of the Prior Art

Urea and commercial fertilizers containing urea are used in solid form as soil fertilizer and in liquid form as both soil and leaf fertilizer. The enzyme urease catalyzes the hydrolysis of urea according to the following reaction equation:

The reaction frequently proceeds so quickly that:
in soil fertilization, particularly on low-sorption and dry soils, a portion of the ammonia freed from the soil can no longer be bonded and escapes into the atmosphere. As a result, substantial quantities of nitrogen which could be utilized by plants are lost.
in leaf fertilization, ammonia quickly occurs in such high concentrations that it can lead to leaf damage and, in part, also be released into the atmosphere.

In general, the threshold value from which point such damage occurs with grains, is at 20 kg/ha N in the form of urea solution or 40 kg/ha N as ammonium nitrate-urea solution (AUS)

To prevent such damage to leaves, it is frequently necessary, in the case of leaf fertilization with fertilizers containing urea, to remain below the dosing level of 60-80 kg/ha N necessary for optimal plant yield.

With the aim of reducing such leaf damage, experiments have been undertaken to apply the liquid containing urea in larger droplets. In doing so, a large portion of the sprayed fluid drains off from the leaves so that, for this reason, less damage is observed. At the same time, however, the real advantage of leaf fertilization, namely the direct and therefore rapid absorption of nitrogen possible with fine-droplet application, is lost.

Application of extremely fine droplets is achieved with rotary nozzles. Instead of 200–400 l/ha of sprayed liquid, 20–40 l/h are used. In doing so, a very intensive sprinkling is achieved which is, however, in the event of dry or warm weather, particularly endangered by evaporation (see page 29, paragraph 4 and page 20, paragraph 1).

To avoid the disadvantages associated with the use of solid fertilizers containing urea in soil fertilization, frequent experiments have been undertaken with the application of substances inhibiting the activity of the enzyme urease, thus retarding the hydrolysis, cf., e.g. DL 122 621, DL 122 178 and DL 121 457 as well as Bundy, L. G. and J. M. Bremner in "Soil Biol. Biochem." 6 (1974) 27-30, 369-76 and J. M. Bremner and L. A. Douglas in "Soil Sci. Soc. Am. Proc." 37 (1973) 225-226.

However, to date, attempts to practically apply such urease inhibitors have been unsuccessful. For example, during storage of solutions containing urea, decomposition of the urea repeatedly occurs, adversely affecting storage stability.

Hence, a need clearly continues to exist for additives for both solid and liquid fertilizers containing urea which will produce mixtures which prevent the loss of $NH_3$ on fields and grassland; are themselves compatible with plants, i.e. do not cause damage; and which bring about enhanced crop yields.

SUMMARY OF THE INVENTION

Accordingly, it is an object of the present invention to provide additives for both solid and liquid fertilizers containing urea which will produce mixtures which present the loss of $NH_3$ on fields and grassland.

It is also an object of this invention to provide additives for both solid and liquid fertilizers containing urea which are themselves compatible with plants, i.e. do not cause damage thereto.

Moreover, it is an object of the present invention to provide additives for both solid and liquid fertilizers containing urea which bring about enhanced crop yields.

According to the present invention, the foregoing and other objects are attained by providing fertilizers containing urea with urease inhibitors, wherein the urease inhibitors are bromo-nitro compounds having the formula:

wherein $A_1$ is $(CH_2)_{n_1}X_1$, and $A_2$ is $(CH_2)_{n_2}X_2$, wherein both $n_1$ and $n_2$ and $X_1$ and $X_2$ are the same or different, the alkyl groups of $A_1$ and $A_2$ are straight-chain or branched-chain alkyl groups, and the substituents $X_1$ and $X_2$ are attached to any one of the carbon atoms of the alkyl groups, and $n_1$ and $n_2$ are 0 to 6, $X_1$ and $X_2$ are H or YR, wherein Y is —O—, —S— or —NH— and R is H or a straight or branched chain $C_1$-$C_6$ alkyl, cyclopent(en)yl, cyclohex(en)yl or phenyl group having one to three methyl groups or attached thereto, and $R_1$ is H or a straight or branched chain $C_1$-$C_6$ alkyl, cyclopent(en)yl or cyclohex(en)yl group having one to three methyl groups or attached thereto.

DETAILED DESCRIPTION OF THE PREFERRED EMBODIMENTS

According to the present invention, additives for both solid and liquid fertilizers containing urea are now provided which:

1. prevent the loss of $NH_3$ on fields and grassland,
2. are themselves compatible with plants, i.e. do not cause damage, and 3. bring about enhanced crop yields.

Additionally, it has been found that the present additives are used advantageously in fertilizers which:

4. achieve, even with slight additions, optimal inhibition of urease,
5. are toxicologically harmless for humans and animals,
6. can be optimally spread on the field and the plants,
7. improve the plant compatibility of the solutions containing urea, and
8. improve the storage stability of solutions containing area.

In order to accomplish the above, the present invention provides fertilizers containing urea with urease inhibitors, wherein the urease inhibitors are bromo-nitro compounds having the formula:

wherein $A_1$ is $(CH_2)_{n_1}X_1$, and $A_2$ is $(CH_2)_{n_2}X_2$, wherein both $n_1$ and $n_2$ and $X_1$ and $X_2$ are the same or different, the alkyl groups of $A_1$ and $A_2$ are straight-chain or branched-chain alkyl groups, and the substituents $X_1$ and $X_2$ are attached to any one of the carbon atoms of the alkyl groups, and $n_1$ and $n_2$ are 0 to 6, $X_1$ and $X_2$ are H or YR, wherein Y is —O—, —S— or —NH— and R is H or a straight or branched chain $C_1$–$C_6$ alkyl, cyclopent(en)yl, cyclohex(en)yl, or phenyl group having one to three methyl groups or attached thereto, and $R_1$ is H or a straight or branched chain $C_1$–$C_6$ alkyl, cyclopent(en)yl or cyclohex(en)yl group having one to three methyl groups or attached thereto.

The Enzyme Urease and its Inhibition

Urease can occur, inter alia, in plants, particularly in the seeds of certain bean varieties and can be extracted from them in crystalline form. A preferred initial product is, e.g., soy beans.

Certain soil bacteria also form urease. In addition, urease also exists in soils, being released from dead bacteria and which, adsorbed by certain soil constituents—in the manner of a support-bound enzyme—develop their activity after a longer period of time.

Comparison of the urease activities of samples of sterilized soils untreated, e.g., by toluene, indicates that only an insignificant decrease in activity is achieved by sterilization. With this measure the bacteria forming urease are killed, though the urease previously formed by the bacteria is not eliminated.

Enzymes are larger protein structures (mol weight of urease from bean seeds is approximately 489,000) with a specific spatial structure for each enzyme and with a particularly characterized site, the active center. The active center is formed in such a way that the substrate molecule can attach itself to the enzyme at this site and enter into bonding with it. Once this has occurred, the so-called enzyme substrate complex (ES complex) is formed, from which the enzymatic reaction proceeds. After each formation reaction, the reaction products leave the active center and the next substrate molecule can attach itself.

Since no enzymatic reaction can proceed without the antecedent formation of the ES complex, the formation of the complex must be prevented for enzyme inhibition. In the case of urease—just as with a number of other enzymes—hydrogen sulfide (SH) groups deriving from the thioamino acid cysteine, take part in the formation of the ES complex. To prevent the development of bonds between SH groups of the urease and urea, the following possibilities are thus available:

1. Inactivation of the urease, i.e. a different occupation of the reactive groups, particularly of the SH groups, by substances with which these groups can preferably enter into different reactions,

| | | |
|---|---|---|
| e.g. | oxidation to disulfides<br>mercaptide formation<br>alkylation<br>addition reaction | } of the active SH groups |

2. Blocking of the active centers of the urease by sterically similar substances, e.g. thiourea.
3. Modification of the urea in such a way that its molecule no longer "fits" in the active center, e.g. by reactions with aldehydes, etc. This route has lead to a special class of sustained release fertilizers, the ureaaldehyde condensation products. These will not be further dealt with here.

On the other hand, there is the aim of discovering substances which are capable of bringing about a urease inhibition following the first or second routes. In order to test such substances, a testing procedure which is as simple as possible is necessary.

The present invention will be further illustrated by certain examples and references which are provided for purposes of illustration only and are not intended to limit the present invention.

Test Procedures for Detection of Inhibitor Effect

For detection of the inhibition of ureolytic urea decomposition by substances with inhibitor effect, sealable flat flange breakers are loaded with 200 g of soil containing urease (water content=50% of maximal water capacity). After introduction of usually 0.5 g of urea prill (cf., however, Table 5) with an in Table 5) with an inhibitor content of usually 1% by weight (cf., however, Table 3, column 3), the flat flange breaker is closed and air is passed through at a rate of approximately 5 l/h. The ammonia driven off by the air is conducted through a sulfuric acid receiver and the receiver liquid back titrated. At the expiration of predetermined periods (see Tables 3 and 5), the releases of $NH_3$ in the individual batches can be determined with the various urease inhibitors.

Systematic Investigation of Urease Inhibitors

The materials investigated with the procedure described in the preceding paragraph for their urease inhibitor effect are listed in Tables 1 and 2.

Table 1 contains substances which from the literature are known to be effective urease inhibitors. For some materials, e.g. maleinimides, further derivatives were synthesized and also investigated. In doing so, it was found that only those materials named in reference to Table 1 could be designated as good inhibitors.

It is possible in the case of the other substances that varying soil characteristics caused an adverse effect on the inhibitor activity.

In Table 2 additional substances are listed, among which a urease inhibitor effect appeared possible. No outstanding inhibitor effect, however, was observed with any of the substances, this being particularly true with those having a fungicidal or bactericidal effect, e.g. Nos. 4 to 38, 31 to 33 and 35 to 41 of Table 4 and Nos. 23, 27 and 28 of Table 2.

Thus no connection between ureas inhibition and pesticidal properties is evident.

TABLE 1

Examination of Substances for their Effect as Urease Inhibitors: Compounds whose inhibitor effect is already known from the literature.

1. $Mn^{++}$
2. $Mg^{++}$
3. $Ba^{++}$
4. $Hg^{++}$
5. $Cu^{++}$
6. $Zn^{++}$
7. $Cd^{++}$
8. $Ni^{++}$
9. $Co^{++}$
10. $Ag^+$
11. Mercury-p-chlorobenzoate
12. Phenylmercuric acetate
13. Copper dimethyldithiocarbamate
14. Iron(II) dimethyldithiocarbamate
15. Zinc dimethyldithiocarbamate
16. Copper sulfate
17. Molybdenum sulfate
18. Zinc sulfate
19. Borax
20. Thiourea
21. 1,3,4-Thiadiazole-2,5-thiol
22. 5-Amino-1,3,4-thiadiazole-2-thiol
23. 1,3,4-Thiadiazoline-2-thione
24. 1,3,5-Thiadiazine-2-thione
25. Thiuram disulfide
26. 2,2'-Di (5-amino-1,3,4-thiadiazole)disulfide
27. 2-Mercapto-1-methylimidazole
28. Pyridine-3-sulfonic acid
29. Desthiobiotin
30. Phenyl ester diamide phosphate
31. 1,4-Benzoquinone
32. 2,6-Dimethyl 1,4-benzoquinone
33. 2,5-Dimethyl 1,4-benzoquinone
34. 2,6-Dichlorobenzoquinone-4-chlorimide
35. Tetrachloro-1,2-benzoquinone
36. Hydroquinone
37. Pyrocatechol
38. Phenol
39. Pyrogallol
40. Resorcinol
41. 1-Napthol
42. Acetohydroxamic acid
43. N—Ethylmaleinimide
44. Oxythiaminechloride
45. Hydroxyurea
46. N'—methyl-N—hydroxyurea
47. N—Acetylmaleinimide
48. N—Acetoximethylmaleinimide
49. N—Aminomaleinimide
50. N—Benzoyloximethylmaleinimide
51. Bis-/N—methylmaleinimide/ether
52. Carbamoylimide
53. Dichloromaleinimide
54. Dimethylmaleic anhydride
55. N—Methylolmaleinimide acetate
56. N—Ethylmaleinimide

TABLE 1-continued

Examination of Substances for their Effect as Urease Inhibitors: Compounds whose inhibitor effect is already known from the literature.

57. N—Ethylmaleinamide acid
58. N—n-Heptylmaleinimide
59. Hexamethylene-bis-maleinimide
60. Isopropylamidomaleinimide
61. Maleinimide
62. N—Methylmaleinamide acid
63. N—(2-Methyl-1-napthyl)maleinimide
64. N—Methylmaleinimide
65. N—Methyloldichloromaleinimide
66. N—Methylolmaleinimide
67. N—(2-Pyridyl)2,3-dimethylmaleinimide
68. N—Methylolmaleinimide phenyl urethane Of these compounds, the quinones 31 to 35, N-Acetoxymethylmaleinimide (48), N-Ethylmaleinimide (56), Maleinimide (61), N-Methylmaleinimide (64) and N-Methylol-maleinimide (66) exhibited the best inhibitor effects.

TABLE 2

Examination of Substances for their Effect as Urease Inhibitors: Additional Compounds Tested:

TABLE 2-continued

Examination of Substances for their Effect as Urease Inhibitors:
Additional Compounds Tested:

10. NC—⌬—=N—COO—NH—CH₃

11. H₃C—C(CH₃)=CH—C(CH₃)=N—OOC—NH—CH₃

12. ⌬—NH—COO—C₆H₂Cl₃ (2,4,5-trichlorophenyl)

13. Pyridyl-C(=N-pyrrolidinyl)—N—C(=O)—O—CH₃

14. ⌬—NH—C(=O)—O—C₆H₄—NO₂

15. ⌬—NH—COO—CH(CH₃)—C≡CH

16. ⌬—NH—C(=O)—N(piperidinyl)

17. O=⌬—N—C(=S)—NH₂

18. (pyrrolyl)—N—C(=S)—N—(pyrrolyl)

19. (cyclohexadienyl)H₂—N—C(=S)—N(CH₃)—CH₃

20. (triazinyl)—N—C(=S)—NH—CH₂—CH=CH₂

21. CH₃—NH—C(=O)—NH—C(=O)—CH₃

22. Cl—C(=N)—...—NH—C₆H₂(CH₃)₃ (trimethylcyclohexyl), with N,N-diazine—HN—CH₂—CH₂

23. (norbornene-dicarboximide)N—S—CCl₃

24. (pyrrolyl)N—S—CCl₃

25. (pyrazolyl)N—S—CCl₃

26. HN—⌬—N—S—CCl₂—CHCl₂ (with C=O groups)

27. (phthalimide)N—S—CCl₂—CHCl₂

28. (norbornene-dicarboximide)N—S—CCl₂—CHCl₂

29. (C₂H₅—O)₂P(=O)—S⊖⊕NH₃—⌬

30. (cyclohexene-dicarbohydrazide): ring with two C(=O)—NH—NH

31. (pyrrolyl)N—C(=O)—CH₂—Cl 32. (norbornene-dicarboximide)N—CH₂—C(CH₃)(CH₂CH₃)H—CH₂—CH₂—CH₂—CH₃

33. ⌬=O with CN substituent

TABLE 2-continued
Examination of Substances for their Effect as Urease Inhibitors: Additional Compounds Tested:

34

35

Thioazoline

36

37

38

39

40

41

42

43

44

45

46

Imidazolinthiones

47

48

49

50

51

Hexathiocanes

52

53

54

Either no urease inhibitor effect or only a very slight one was observed.

In further search for a urease inhibitor, the bromo-nitro derivatives were determined to be inhibitors, which surprisingly were exceptionally effective. The test results compiled in Table 3 demonstrate that, with the use of 1% inhibitor (with reference to the amount of urea), substances 1-10 give satisfactory results ($NH_3$ release less than 1% after 7 days). With the use of only ¼% inhibitor, at 4 days of operating time, there are only 3 of the bromo-nitro compounds.

Table 4 lists additional tested bromo-nitro compounds whose effectiveness, however, does not approach that of the first 4 substances of Table 3.

TABLE 3

Inhibitor effect of bromo-nitro compounds. N losses of the soil through $NH_3$ volatilization as % of the urea-N quantities used.

| Operating Time in Days | | 4 | 7 |
|---|---|---|---|
| Dosing of the Inhibitor in % of the Urea-N Quantity Used | | 0.25 | 1 |
| No. | Inhibitor | $NH_3$ % | Volatilization % |
| a | Control (Urea Without Inhibitor) | 52.8 | 71.2 |
| 1 | 2-Bromo-2-nitro-propyl-N—methylcarbamate | 0.3 | 0.0 |
| 2 | 2-Bromo-2-nitro-butyl-N—methylcarbamate | 0.5 | 0.0 |
| 3 | 2-Bromo-2-nitro-propan-1,3-diol | 0.9 | 0.0 |
| 4 | 2-Bromo-2-nitro-propanol | 2.1 | 0.0 |
| 5 | 1-Bromo-1-nitro-3,3.dimethyl-butane-2-ol | 4.7 | 0.0 |
| 6 | 1-Bromo-1-nitro-pentanol-2 | 6.5 | 0.0 |
| 7 | 1-Bromo-1-nitro-butanol-2 | 8.3 | 0.0 |
| 8 | 1-Bromo-1-nitro-3-methyl-butane-2-ol | 10.0 | 0.1 |
| 9 | 2-Bromo-2-nitro-propyl-bis-N—methyl carbamate | 10.4 | 0.1 |
| 10 | 2-Bromo-2-nitro-butanol-3 | 18.4 | 0.3 |
| 11 | 1-Bromo-1-nitro-propanol-2 | — | 2.3 |
| 12 | 1-Bromo-1-nitro-2-phenyl-ethanol-2 | 27.5 | 3.0 |
| 13 | 1-Bromo-3,3,3-trichloro-1-nitro-propane-2-ol | 33.5 | 4.6 |
| 14 | 1,4-Dibromo-1,4-dinitro-butanediol-2,3 | 37.7 | 4.3 |
| 15 | 1,3,3,3-Tetrabromo-1-nitropropan-2-ol | 41.4 | 15.2 |

TABLE 4

Additional Bromo-Nitro Compounds Tested for Their Inhibitor Effect 1. 2-Bromo-2-nitropropyl-N—trimethylcyclohexylcarbamate
2. 3-Bromo-3-nitrobutyl-N—trimethylcyclohexylcarbamate
3. Isopropyl-bis-N—2-bromo-2-nitro-propylcarbamate
4. Isoprol-bis-N—3-bromo-3-nitro-butylcarbamate
5. 2,2,4-Trimethyl-hexamethylene-bis-N—2-bromo-2-nitro-propylcarbamate
6. 2,2,4-Trimethyl-hexamethylene-bis-N—3-bromo-3-nitro-butylcarbamate
7. 3-Bromo-3-nitro-butyl-N—phenylcarbamate
8. 2-Bromo-2-nitropropyl-N—phenylcarbamate
9. 2-Bromo-2-nitropropyl-N—m-toluylcarbamate
10. 2-Bromo-2-nitrobutyl-N—m-toluylcarbamate
11. 2-Bromo-2-nitropropyl-N—2,6-dimethylphenyl-carbamate
12. 2-Bromo-2-nitropropyl-N—3-chlorophenylcarbamate
13. 2-Bromo-2-nitrobutyl-N—3-chlorophenylcarbamate
14. 2-Bromo-2-nitropropyl-N—3,4-dichlorophenylcarbamate
15. 2-Bromo-2-nitrobutyl-3,4-dichlorophenylcarbamate
16. 2-Bromo-2-nitrobutyl-N—3,5-dichlorophenylcarbamate
17. 2-Bromo-2-nitropropyl-N—3-trifluoromethylphenylcarbamate
18. 2-Bromo-2-nitrobutyl-N—3-trifluoromethylphenylcarbamate
19. Bis-2-Bromo-2-nitropropyl-N—durocarbamate
20. 2-Bromo-2-nitropropyl-N—isopropylcarbamate
21. 2-Bromo-2-nitropropyl-N—t-butylcarbamate
22. 2-Bromo-2-nitropropyl-N—trans-trimethylcyclohexyl-carbamate
23. 2-Bromo-2-nitropropyl-N—cyclodecylcarbamate
24. 2-Bromo-2-nitrobutyl-N—isopropylcarbamate
25. 2-Bromo-2-nitrobutyl-N—t-butylcarbamate
26. 2-Bromo-2-nitrobutyl-N—cyclododecylcarbamate Of these compounds, none, however, achieves the effectiveness of 2-bromo-2-nitro-propyl-N-methylcarbamate (Substance 1 of Table 3).

Approximately 1 week after the tests recorded in Table 3, the tests for the substances 2-4 of Table 3 were repeated with another soil type. In doing so (cf. Table 5) it was found:

1. The urease effect is dependent on the soil type.
2. When double the quantity of urea is used, the $NH_3$ release increases not simply twofold but far higher, e.g. for the control sample over a five-day test, from 14.2% not to 28.4%, but as high as 39.7%.

TABLE 5

Inhibitor Effect with Various Urea Quantities per Surface Area N Losses of the Soil Through $NH_3$ Volatilization Calculated as % of the Urea—N Quantities Used

| No. | Inhibitor (1% of the Urea Quantity) | Urea g/100 $cm^2$ | Days/operating Time | | |
|---|---|---|---|---|---|
| | | | 3 % | 5 % | 7 % |
| a | Control (Urea without Inhibitor) | 0.3 | 1.7 | 14.2 | 16.8 |
| 1 | 2-Bromo-2-nitro-propyl-N—methylcarbamate | 0.3 | 0.0 | 0.0 | 1.2 |
| 3 | 2-Bromo-2-nitro-propan-1.3-diol | 0.3 | 0.0 | 0.0 | 0.0 |
| 4 | 2-Bromo-2-nitro-propanol | 0.3 | 0.0 | 0.0 | 3.6 |
| a | Control (Urea without Inhibitor) | 0.6 | 11.9 | 39.7 | 44.7 |
| 1 | 2-Bromo-2-nitro-propyl-N—methylcarbamate | 0.6 | 0.0 | 0.0 | 0.1 |
| 3 | 2-Bromo-2-nitro-propan-1.3-diol | 0.6 | 0.0 | 0.0 | 0.5 |
| 4 | 2-Bromo-2-nitro-propanol | 0.6 | 0.0 | 0.0 | 10.9 |

According to the test results of Tables 3 and 5, it was not possible in any instance to expel 100% of the $NH_3$ which could be developed from the urea. This can be attributed to the sorption forces of the soil retaining the residual $NH_3$. It would also be conceivable that a portion of the unexpelled $NH_3$—particularly in the case of the samples treated with the bromo-nitro compounds—was immediately converted to $NO_3$.

One test, however, with ammonium sulfate and 2-bromo-2-nitro-propanol showed that the urease inhibitors according to the invention do not exert any stimulating effect on nitrification.

Neither among the known urease inhibitors (Table 1) nor among the compounds of Table 2 was there a substance found that met the aims listed on pages 2 and 3; instead—surprisingly—it was found among the bromo-nitro compounds.

Similar bromo-nitro compounds are used by the Henkel company as antimicrobial agents (cf. DE 16 42 058, 17 67 586, particularly for washing purposes, DE 16 68 995, 17 67 684, 19 43 112). Bromo-nitro compounds are recommended for keeping cut flowers in a fresh state in DE-AS 21 13 209 and 21 13 210. BOOTS Pure Drug employs these compounds for combatting phytopathogenic bacteria (GB 1 193 954).

Bromo-nitro compounds are used by BASF as fungicides: DE-OS 20 54 887. Compare also "Chemie der Pflanzenschutz- und Schaedlingsbekaempfungsmittel" [Chemistry of Plant Protective and Pest Control Agents], Berlin, Heidelberg, New York. R. Wegler, editor; vol. 3 (1976) p 279, vol 4 (1977) p 150, vol. 6 (1981) p 373.

As shown in Tables 1 and 3, it cannot be concluded from their fungicidal or antibacterial properties that the substances in question would have to be urease inhibitors. This effectiveness of the bromo-nitro compounds appeared quite unexpectedly, while with the known plant treatment agents and particularly among the fungicides the same was not to be observed, at least not among those which are less harmful to plants in contrast with the compounds 1–16, among which a serious plant damaging effect can be present.

Consequently, it remains to be determined that it was possible to find additives among the nitro compounds which assist fertilizing agents containing urea in achieving their optimal effectiveness. These bromo-nitro compounds suitable as additives have the formula whereby whereby both $n_1$ and $n_2$ as well as $X_1$ and $X_2$ can be equal or different and the alkyl groups of $A_1$ and $A_2$ can be straight or branched and the substituents $X_1$ and $X_2$ can be on any given C, preferably in $\alpha$- or $\omega$-position to the bromo-nitro-carbon atom, and whereby

$n_1$ and $n_2$ can have the values 0 to 6 and
$X_1$ and $X_2$ signify H or YR respectively with
  Y=O, S or NH and
  R=H a straight or branched chain
  $C_1$ to $C_6$-alkyl or a cyclopent(ene)yl, cyclohex(ene)yl or phenyl group containing 1 to 3 methyl groups or $R_1$ can be one of the substituents indicated for R (exclusive of the last named).

The compounds of Nos. 1–4 according to Table 3 have proven to be particularly advantageous.

(1)

(2)

(3)

and (4)

Of the group of the bromo-nitro compounds, Substance 3, Table 3 has also been used for other indications, e.g., in the pharmaceutical and cosmetic fields. It is listed in the Farm Chemical Handbook 1981 in the Pesticide Dictionary as bronopol, its $LD_{50}$ being given as 400 mg/kg upon oral ingestion by rats. In concentration of up to 15% of urea-N it is no longer in the toxicologically dangerous range. For its proposed use and with the method of dispersal provided, no dangers are to be feared for humans and animals.

Use of Various Fertilizers Containing Urea as Soil Fertilizers

The results of the tests in Mitscherlich pots are compiled in Tables 6 and 7.

In Table 6 the various urease inhibitors as urea additives for soil fertilization are compared with one another. Both in overall crop yield as well as in N absorption and in raw protein content, the best results are achieved with bromo-nitro compounds. The maleic derivatives and the quinone product furnish poorer results.

In the experiments in Table 7 on rye grass, urea, with and without urease inhibitors, used as a soil fertilizer in application amounts between 0.5 and 1.0 g N/pot, was tested in comparison with KAS. As a product from the maleinimide group, Substance 64 from Table 1, i.e. N-methylmaleinimide was added; from the bromo-nitro compounds, Substance 1 of Table 2, bromo-2-nitropropyl-N-methylcarbamate was added. In this test series also, the combination urea+2% bromo-nitro compound proved superior to the corresponding mixture with 2% of a maleinimide compound and, of course, to the series with urea alone. The yield of dry solids scarcely increases as the application of fertilizer increases from 0.75 to 1.0 g N both with urea fertilization alone as well as with the addition of a maleinimide compound. The N absorption or the raw protein quantity in both cases is significantly increased and, with the addition of a urease inhibitor, more strongly than without such addition.

TABLE 6

Pot experiments with rye grass (5 cuttings between June 6 and November 5) with urea as soil fertilizer in quantities of four times 1.0 g N/pot as well as top-dressing after each cutting with the addition of various urease inhibitors (2% or the urea quantity) on loamy sand, limed to pH 5.6, with a basic fertilizer for each pot of 0.5 g N as nitromagnesia (20 + 7 + 0.2)

2.25 g P$_2$O$_5$ +         as Thomas potash 0/15/20
3.00 g K$_2$O
and subsequent fertilization of
2.0 g K$_2$O as KCL        as solution several days
and 0.5 g Mg as MgSO$_4$.7H$_2$O    before 3rd cutting

| Urease Inhibitor in Quantities of 2% | Dry Substance 1st–5th Cutting g/Pot | N—absorption g/Pot | Raw Protein % in Dry Substance |
|---|---|---|---|
| none | 111.0 | 2.30 | 13.0 |
| Subst. 1-Tab. 3 | 131.7 | 3.29 | 15.6 |
| Subst. 3-Tab. 3 | 128.6 | 3.15 | 15.3 |
| Subst. 4-Tab. 3 | 127.8 | 3.09 | 15.1 |
| Subst. 31-Tab. 1 | 118.3 | 2.54 | 13.4 |
| Subst. 48-Tab. 1 | 129.7 | 2.85 | 13.7 |
| Subst. 66-Tab. 1 | 125.0 | 2.85 | 14.3 |
| Subst. 68-Tab. 1 | 124.0 | 2.83 | 14.3 |

TABLE 7

Pot tests for rye grass (5 cuttings from June 23 to November 27) with urea as soil fertilizer, optionally with 2% urease inhibitors in quantities of 0.5, 0.75 and 1.0 g N/pot as top-dressing after each cutting on loamy sand, limed to pH 5.6, with a basic fertilization for each pot of 0.5 g N as nitromagnesia (20/7/0.2)

2.25 g $P_2O_5$
3.00 g $K_2O$ } as Thomas potash 0/15/20 and subsequent fertilization of 2.0 g $K_2O$ AS KCL
and 0.5 g Mg as $MgSO_4.7H_2O$ } as solution several days before 3rd cutting

| Fertilizer | Urea | | | | Urea 1 - Tab. 3 | | | Urea 64 - Tab. 1 | | | KAS | | |
|---|---|---|---|---|---|---|---|---|---|---|---|---|---|
| Additive | — | | | | 2-Bromo-2-nitro propyl-N—carbamate | | | N—Methylmalein- imide | | | — | | |
| N Fertilization g N/Pot | 0 | 0.5 | 0.75 | 1.0 | 0.5 | 0.75 | 1.0 | 0.5 | 0.75 | 1.0 | 0.5 | 0.75 | 1.0 |
| Dry Substance g N/Pot | 11.1 | 65.1 | 73.4 | 73.7 | 70.9 | 79.7 | 86.4 | 68.9 | 81.7 | 81.9 | 83.3 | 92.7 | 99.9 |
| N Absorption mg/Pot | 156 | 1114 | 1368 | 1571 | 1432 | 2095 | 2720 | 1285 | 1676 | 1944 | 1486 | 2386 | 3033 |
| Raw Protein % of Dry Subst | 8.8 | 10.70 | 11.65 | 13.32 | 12.62 | 16.43 | 19.68 | 11.66 | 12.82 | 14.84 | 11.15 | 16.09 | 18.98 |

Urea prills are preferably used for soil fertilization. In addition, NP, NK, N Mg fertilizers or complete NPK fertilizers with corresponding urea contents can be used. Micronutrients (=trace elements), fungicides, insecticides, stalk growth inhibitors, plant hormones, nitrification inhibitors, etc. can also be added to the fertilizing agents containing urea.

Liquid fertilizers containing urea, optionally with ammonium nitrate or sodium nitrate, can be advantageously applied to the field with drag hoses (EP 0 015 325) or with the suspension nozzles (EP 0 015 325) having a downward pointed nozzle before sowing (and optionally at various growth stages) as soil fertilizer. Suitable for this purpose among the fertilizers containing urea are primarily technically pure urea solutions (of 20-40% by weight N) or ammonium nitrate-urea solutions (=AUS), preferably with 340 to 360 g N/l, and, optionally, with the addition of minute quantities of trace nutrients. To all of these fertilizing agents containing urea, the bromo-nitro compound is to be added in quantities of 0.05 to 15% by weight of the urea N.

As shown by the tests of Tables 6 and 7, quantities of 2% relative to urea are preferable when using urea prills.

The mixtures according to the invention used for the experiments of these tables were produced by powdering the urea prills with said bromo-nitro compounds; optionally, the prills can be sprayed before powdering with a hydrocarbon oil to improve adhesion. The bromo-nitro compounds soluble in liquid fertilizers containing urea pose no problems of distribution in dissolved fertilizers containing urea. In the case of slightly soluble bromo-nitro compounds, stirring must occur during the distribution. Optionally, solutizing agents can be added.

Use of Various Fertilizers Containing Urea as Leaf Fertilizer

In contrast with fertilization on the soil which serves as a buffer for an even flow of nitrients, with leaf fertilization the plant receives the nutrients of the particular solution being sprayed all at once. In this case the nutrients penetrate into the plant at different rates.

The speed of nutrient absorption in the case of leaf fertilization depends, inter alia, according to findings to date, primarily the following factors:

a. in the domain of the plant, its morphology and particularly upon the surface structure of the leaves, e.g., their pilosity, the number of slit apertures/$cm^2$ (on the upper and lower sides of the leaf) formation of wax layers, drainage system to
supply system from } other plant parts, and on the time of application within the vegetation cycle, on the distribution of vegetable urease on the surface and the specific compatibility with respect to ammonium ions.

b. climate parameters temperature, relative humidity, intensity of sunlight, i.e., the climate conditions before, during and after application c. type of fertilizer solution with respect to composition, concentration, solid content, osmotic pressure, surface tension, wetting angle of the droplets, water activity.

d. spray device and spraying method impact energy of the droplets, droplet size spectrum net coating density.

There are thus a multitude of influencing variables present which operate in a complex fashion in positive and negative interaction. Their influence cannot be dealt with here in detail, though it is possible to select only a few examples.

Thus, e.g., the pilosity of the leaves keeps the sprayed droplets away from sensitive areas of the leaf surface. Rainfall and aridity determine the wax layer, the swelling condition of the cuticles and the water content of the plant, and thereby have a retroactive effect on the plant compatibility of urea and/or ammonium salts.

A further significant property of the leaf fertilizer solutions is their so-called water activity (critical relative humidity CRH). This indicates the relative humidity of the air at a given temperature (as percent of the corresponding saturation humidity) at which, in the case of a (moisture-sensitive) material under observation, water neither evaporates nor is absorbed. In other words, at a higher relative humidity water is absorbed; at a lower relative humidity, on the other hand, water is given off, i.e. an evaporation of water occurs, so that the droplets of a substance in solution shrink.

While with fertilizer granulates a low CRH value is a great disadvantage for their storage stability, for fertilizer solutions a low CRH value it is generally a great advantage for their use as leaf fertilizer. The droplets of such leaf fertilizers, while in passage from the spray nozzle to the target surface, remain intact or they can even expand. At higher CRH values a drying up of the droplets would occur and simultaneously release the plant treatment agent applied with the leaf fertilization.

Figure 1:
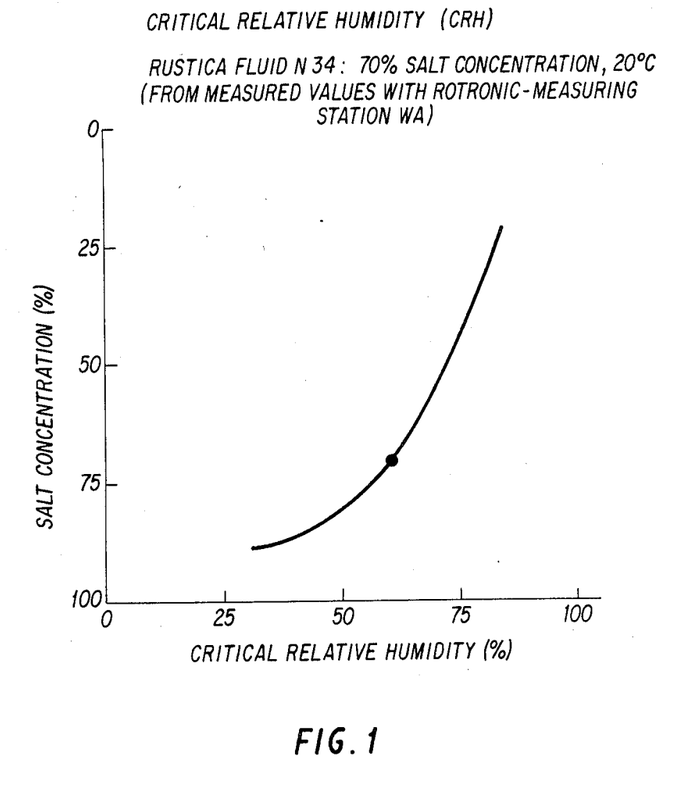
FIG. 1 illustrates the critical relative humidity as a factor of the salt concentration for the commercial fertilizer RUSTIC fluid N 34.

For the commercial fertilizer RUSTIC Fluid N 34, which contains approximately 13.6% by weight of ammonium nitrate and approximately 13.4% by weight of urea-N as well as minute amounts of MgO and traces of Mn and Cu, regarded thus primarily as AUS, the critical relative humidity shown in FIG. 1 was determined as a factor of the salt concentration.

For the storage of fertilizer solutions containing urea, especially AUS in containers, which allow a gas exchange with the atmosphere whereby water can be given off or absorbed, the CRH value during the storage period determines the stability of the concentration. The level of the CRH value depends, inter alia, e.g. with AUS on the proportion urea/ammonium nitrate. If urease should penetrate into the AUS depot, ureolytic urea decomposition can set in, release $NH_3$ and thus trigger losses of nitrogen. The urea/ammonium nitrate ratio is displaced negatively with respect to solubility, as a result of which ammonium nitrate crystals are formed. The additive according to the invention avoids this urea hydrolysis.

The temperature dependence of this curve is low—particularly at high salt concentration. At lower salt concentration, e.g., 20%, the CRH value for 30° C. amounts to 83% and for 10° C., 86.5%. In the attached diagram the dispersion range at various temperatures has been omitted.

Generally this fertilizer solution is delivered with a salt concentration of 70% corresponding to a CRH value of 65% (shown in the diagram with a heavy dot). During spraying, a certain loss of water generally occurs so that the salt concentration is increased and simultaneously the CRH value drops. Since the humidity in Central Europe remains perfectly between 50 and 60% relative humidity, droplets of the sprayed AU-solutions generally remain intact during application or even increase slightly. This concentration effect lowers the CRH values to this order of magnitude even if the AUS is diluted with water before being discharged.

In the case of solutions of pure urea or pure ammonium nitrate, on the other hand, such favorable, low CRH values are not attained, e.g., for 50% urea solution as for 100% salts between 10° and 30° C., 75-76% or for 40% ammonium nitrate solution at 10° C., 76.5°, at 20° C. 79.4% and at 30° C. 76.7%. Even in the case of this salt the dependence of the salt concentration—as with urea alone—is slight. In the case of these "pure" salt solutions, scorching occurs more easily as a result of salt precipitation than is the case with AUS.

Ammonium nitrate solutions remain intact as droplets up to a certain relative humidity of 40% for a certain time during spraying and even later on the plant. This physical phenomenon opens up the possibility of using AUS as a support material or as additive for a support material for plant protection measures, especially when operating with small support material volumes, as is the case with rotating nozzles. Since with reduction of the support material volume the agent concentration increases, and the $H_2O$ content drops correspondingly, the risk of evaporation with traditional spraying increases further. Dry and warm weather intensify such risk, especially with application as fine droplets. Through evaporation of the support material the plant treatment agent can be released as an aerosol. It is then lost for its actual intended purpose.

The support material volumes corresponding to the rotating nozzle process, as horticultural experiments have shown, are extremely well tolerated by the plants as inhibited ammonium nitrate-urea solution.

Test results with urea in the form of urea or ammonium nitrate-urea solution corresponding to a total content of approximately 0.15 g N/pot are compiled in Table 8. (In the case of the test series with AUS and urea, equal quantities of N were used. The quantities of the urease inhibitors used were increased in the same way in both test series. If, however, the inhibitor material is related to the use of urea-N, this means that in the case of AUS double the quantity comes into play.)

In the experiments of Table 8 it is seen that in the case of solutions of urea alone, optimal crop yields, N absorption or raw protein contents are achieved only with urease inhibitor quantities of 4% of the urea-N. An increase in the quantity of the urease inhibitor of 2 to 4% of the urea-N dose brings an enhancement of the yields with pure urea solution.

In the case of AUS the optimum is also achieved at 4% inhibitor relative to urea-N. A further increase brings no further advantages.

TABLE 8

Pot tests with spring wheat, sirocco type, with urea as leaf fertilizer in EC-stage 39-49, 51-55 and 59-61* in quantities of 0.05 g N/pot in the case of urea solutions (approx. 25 percent by weight), or 32-37, 39-49 and 51-59* in quantities of 0.05 g N/pot in the case of AUS (approx. 70% by weight) and subsequent top-dressing with KAS at EC-stage 51-59* in quantities of 0.30 g N/pot in all cases and without the addition of 2-bromo-2-nitropropyl-N—carbamate as urease inhibitor.

| 2 sp No. | Fertilizer Type (Quantity s, above | Inhibitor Quantity/100 g Urea - N | Dry Substance g/pot | N absorption mg/pot | Raw Protein % |
|---|---|---|---|---|---|
| 1 | AUS | 0 | 63.77 | 1039 | 10.2 |
| 2 | AUS | 4 | 68.68 | 1058 | 9.63 |
| 3 | AUS | 8 | 68.69 | 1051 | 9.56 |
| 4 | Urea | 0 | 64.16 | 962 | 9.38 |
| 5 | Urea | 2 | 65.11 | 951 | 9.13 |
| 6 | Urea | 4 | 68.36 | 1046 | 9.56 |

*s. Zadok, Chang and Konzak, EUCARPIA-Bulletin No. 7, 1974 (EUCARPIA: Europaeische Gesellschaft fuer Pflanzenzuechtung [European Society for Plant Breeding])

The increase of crop yield with urease inhibitor quantities of optimally 4% of the urea-N cannot be explained on the basis of the nitrogen effect alone. A possible cause may be found in the activation of the phytohormone system, for which no direct dependence on the N quantity can be claimed.

A causal relationship between the nitrogen nutrition and hormone supply, particularly with cytokinin, has already been indicated by Michael et al. ("Pflanzenernaehrung und Bodenkunde" [Plant Nutrition and Soil Science] 125 (1970) pp 24ff) and H. Herzog ("Pflanzenernaehrung und Bodenkunde" [Plant Nutrition and Soil Science] 144 (1981) pp 16ff and 241 ff) and others. Herzog explains differing results by type-specific properties, particularly with respect to the conversion time and intensity in the plant.

Urea inhibitors are not considered in these studies. It may, however, be assumed that the urea, temporarily conserved by the bromo-nitro compounds, in the case of leaf application is not immediately integrated into the metabolism. It is conceivable that, together with the plant hormones, systems are thereby generated which prevent harmful reaction impulses so that a controlled system is created, assuring the reasonable subsequent delivery of assimilable nitrogen as well as the optimal absorption of the nitrogen itself by the plant.

With respect to mixing compatibility with other plant treatment agents, it was possible to determine that this is comparable with that of other commercially available leaf fertilizers; the bromo-nitro compounds are, however, more plant-compatible and produce higher yields.

Quantity application in the case of leaf fertilization is determined in the same way as with soil fertilization. In the case of leaf fertilization, the following advantages of liquid fertilizer containing urea with additives of bromo-nitro compounds according to the present invention, can be identified:

a. They permit reasonable quantities to be used for leaf fertilization without damage to the plants (see p 2).
b. They increase the crop yield and,
c. as support material for plant treatment agents, they afford a spray liquid which, under our climatic conditions and even during dry weather, does not volatilize in passage from the nozzle to the target surface and also remains on the leaf for a longer period.
d. They therefore allow a fine-spray discharge of the spray liquid adapted to numerous plant protective measures.
e. They permit the admixture of other plant treatment agents.
f. Damage to plants does not result with their use as a support material in conjunction with rotating nozzles in the case of the usual input per individual treatment of 20–50 l/ha.
g. As a result of the delayed release of the nitrogen, which can be absorbed by the plants, no losses of urea-nitrogen used as fertilizer occur.
h. They continually and intensively stimulate the phytohormone system in the plant and are nevertheless plant compatible.

A further object of the application is the use of the mixture of fertilizers containing urea and bromo-nitro compounds in solid state.

If the mixtures are optionally present in conditioned granulated form, their use on crops is possible both before and, circumstances permitting, during the crop growth period.

In addition, a standard fertilizer spreader can be used. Manual dispersal is, of course, also possible.

The mixtures according to the invention introduced in (primarily aqueous) solution can be used both for soil and leaf fertilization. This is determined both by the point of time of the fertilizer application during the vegetation period and by the crop spraying device or the spraying method used.

The advantage of the dispersal process with liquids consists in the possibility of conveniently combining other crop care measures, e.g., an additional supply of trace nutrients if corresponding deficiency diseases are observed, or combatting other detected diseases, pests and/or weeds with the appropriate micronutrients, nematocides, fungicides, bactericides, insecticides, miticides and/or appropriate special herbicides.

For transport the fertilizers can reach the distribution point as close to full strength as possible. For dispersal on the field, on the other hand, it is more advantageous to start with maximally diluted solutions. The fertilizer solutions procured from industry or trade are therefore to be diluted before field application frequently in the ratios 1:1, 1:2, 1:3 or even 1:10 and higher.

For industry engaged in production of primarily aqueous solutions containing urea which must be evaporated to urea smelts with 1% $H_2O$ with an expenditure of energy, this also means that for urea solutions, evaporation can terminate at urea contents of 70 to 75%.

Having now fully described the invention, it will be apparent to one of ordinary skill in the art that many changes and modifications can be made thereto without departing from the spirit or scope of the present invention as set forth herein.

What is claimed as new and desired to be secured by Letters Patent of the United States is:

1. Fertilizers containing urea with urease inhibitors, wherein the urease inhibitors are bromo-nitro compounds having the formula:

wherein $A_1$ is $(CH_2)_{n_1}X_1$, and $A_2$ is $(CH_2)_{n_2}X_2$, wherein both $n_1$ and $n_2$ and $X_1$ and $X_2$ are the same or different, the alkyl groups of $A_1$ and $A_2$ are straight-chain or branched-chain alkyl groups, and the substituents $X_1$ and $X_2$ are attached to any one of the carbon atoms of the alkyl groups, and $n_1$ and $n_2$ are 0 to 6, $X_1$ and $X_2$ are H or YR, wherein Y is —O—, —S— or —NH— and R is H or a straight or branched chain $C_1$–$C_6$ alkyl, cyclopent(en)yl, cyclohex(en)yl or phenyl group having one to three methyl groups or attached thereto, and $R_1$ is H or a straight or branched chain $C_1$–$C_6$ alkyl, cyclopent(en)yl or cyclohex(en)yl group having one to three methyl groups or attached thereto.

2. The fertilizers containing urea according to claim 1, wherein said bromo-nitro compound has the formula:

3. The fertilizers containing urea according to claim 1, wherein said bromo-nitro compound has the formula:

4. The fertilizers containing urea according to claim 1, wherein said bromo-nitro compound has the formula:

$$CH_3-\underset{\underset{NO_2}{|}}{\overset{\overset{Br}{|}}{C}}-CH_2-O-\overset{\overset{O}{\|}}{C}-\overset{\overset{H}{|}}{N}-CH_3.$$

5. The fertilizers containing urea according to claim 1, wherein said bromo-nitro compound has the formula:

$$CH_3-CH_2-\underset{\underset{NO_2}{|}}{\overset{\overset{Br}{|}}{C}}-CH_2-O-\overset{\overset{O}{\|}}{C}-\overset{\overset{H}{|}}{N}-CH_3$$

6. The fertilizers containing urea according to claim 1, wherein to each 100 parts by weight of urea-N, about 0.05 to 15 parts by weight of the bromo-nitro compound is added.

7. The fertilizers containing urea according to claim 6, wherein to each 100 parts by weight of urea-N, about 0.4 to 4 parts by weight of said bromo-nitro compound is added.

8. The fertilizers containing urea according to claim 1, wherein said urea is used in form of prills or granulates.

9. The fertilizers containing urea according to claim 1, wherein said fertilizers are the NP, NK, NMg fertilizers or complete fertilizers.

10. The fertilizers containing urea according to claim 1, which further comprise micronutrients, plant treatment agents or a mixture thereof, wherein said plant treatment agents are selected from the group consisting of herbicides, fungicides, insecticides, stalk growth inhibitors, plant hormones and nitrification inhibitors.

11. The fertilizers containing urea according to claim 1, wherein said urea is used as a solution containing urea.

12. The fertilizers containing urea according to claim 11, wherein said solutions are aqueous solutions.

13. The fertilizers containing urea according to claim 11, wherein said solutions containing urea are about 5 to 40% by weight urea.

14. The fertilizers containing urea according to claim 12, wherein said aqueous urea solutions are obtained from various evaporation stages during the synthesis of urea.

15. The fertilizers containing urea according to claim 11, wherein said solutions containing urea are ammonium nitrate-urea solutions with a nitrogen (N) content of from about 1 to 32% by weight.

16. The fertilizers containing urea according to claim 15, wherein said ammonium nitrate-urea solutions have a nitrogen content of about 28% by weight.

17. The fertilizers containing urea according to claim 11, wherein said solutions further comprise soluble phosphates, potash or magnesium salts or a mixture thereof.

18. The fertilizers containing urea according to claim 11, wherein said solutions further comprise micronutrients, plant treatment agents or a mixture thereof, wherein said plant treatment agents are selected from the group consisting of herbicides, fungicides, insecticides, stalk growth inhibitors, plant hormones, solution stabilizers or a mixture thereof.

19. The fertilizers containing urea according to claim 11, wherein said aqueous solutions are further diluted with water prior to field application, such that about 1 part of solution containing urea is mixed with about 1 to 2 parts of water.

20. The fertilizer containing urea according to claim 1, wherein $X_1$ and $X_2$ are located at the $\alpha$- or $\omega$-position of the bromo-nitro compound.

21. A method of fertilizing soil which comprises applying an effective amount of the fertilizers containing urea according to claim 1 to the soil.

22. The method of fertilizing soil according to claim 21, wherein said fertilizers containing urea are applied in two or more dosings at optimally chosen stages of growth.

23. The method of fertilizing soil according to claim 21, wherein said fertilizers containing urea have said bromo-nitro compounds in quantities of from about 0.05 to 15 parts by weight per 100 parts by weight of urea-N.

24. The method of fertilizing soil according to claim 21, wherein said application is effected by suitable fertilizer spreaders, field spraying devices or a mixture thereof.

25. A method of fertilizing leaves which comprises applying an effective amount of the fertilizers containing urea according to claim 1 to said leaves.

26. The method of fertilizing leaves according to claim 25, wherein said fertilizer containing urea are applied in two or more dosings at optimally chosen stages of growth.

27. The method of fertilizing leaves according to claim 25 wherein said fertilizers containing urea have said bromo-nitro compounds in quantities of from about 0.05 to 15 parts by weight per 100 parts by weight of urea-N.

* * * * *